US012244103B2

(12) United States Patent
Jung et al.

(10) Patent No.: US 12,244,103 B2
(45) Date of Patent: Mar. 4, 2025

(54) CONNECTING COMPONENT FOR SHIELDING A CONNECTOR AND A SHIELD CONNECTOR COMPRISING THE SAME

(71) Applicants: HYUNDAI MOTOR COMPANY, Seoul (KR); KIA CORPORATION, Seoul (KR); KOREA ELECTRIC TERMINAL CO., LTD., Incheon (KR)

(72) Inventors: Yun Jae Jung, Suwon-si (KR); Hun Hee Oh, Incheon (KR); Sug Il Kang, Incheon (KR)

(73) Assignees: HYUNDAI MOTOR COMPANY, Seoul (KR); KIA CORPORATION, Seoul (KR); KOREA ELECTRIC TERMINAL CO., LTD., Incheon (KR)

( * ) Notice: Subject to any disclaimer, the term of this patent is extended or adjusted under 35 U.S.C. 154(b) by 537 days.

(21) Appl. No.: 17/672,368

(22) Filed: Feb. 15, 2022

(65) Prior Publication Data

US 2022/0278491 A1 Sep. 1, 2022

(30) Foreign Application Priority Data

Feb. 26, 2021 (KR) ........................ 10-2021-0026575

(51) Int. Cl.
*H01R 13/6585* (2011.01)
*H01R 13/6592* (2011.01)

(52) U.S. Cl.
CPC ..... *H01R 13/6585* (2013.01); *H01R 13/6592* (2013.01)

(58) Field of Classification Search
CPC ............ H01R 13/6585; H01R 13/6592; H01R 13/5202; H01R 13/6593; H01R 13/6599;
(Continued)

(56) References Cited

U.S. PATENT DOCUMENTS 3,094,364 A * 6/1963 Liagg .................. H01R 13/629 285/20
4,927,374 A * 5/1990 Batty .................. H01R 13/645 29/830
(Continued)

FOREIGN PATENT DOCUMENTS

CN 209766778 U 12/2019
JP 5197635 B2 2/2013
(Continued)

*Primary Examiner* — Edwin A. Leon
(74) *Attorney, Agent, or Firm* — Lempia Summerfield Katz LLC

(57) ABSTRACT

A connecting component for shielding a connector, and a shield connector including the same, improve electromagnetic wave blocking performance by improving adhesion to a shield component. The connecting component for shielding a connector includes: a housing body configured to surround at least a portion of a wire and to have a first end portion to which a first shield component is coupled and a second end portion to which a second shield component is coupled; a mounting groove formed in the second end portion of the housing body to allow the second shield component to be mounted therein; and a plurality of contact protrusions formed in the mounting groove so as to be in contact with the second shield component coupled to the second end portion of the housing body.

10 Claims, 5 Drawing Sheets

(58) Field of Classification Search
CPC .... H01R 13/648; H01R 13/40; H01R 13/502; H01R 13/6581; H01R 13/6598
See application file for complete search history.

(56) References Cited

U.S. PATENT DOCUMENTS

| | | | | |
|---|---|---|---|---|
| 7,214,080 | B2 * | 5/2007 | Ichio | H01R 13/6272 439/246 |
| 7,344,413 | B2 * | 3/2008 | Nishida | H01R 13/65912 439/607.41 |
| 7,588,461 | B2 | 9/2009 | Tyler | |
| 8,147,272 | B2 * | 4/2012 | Rhein | H01R 13/5202 439/556 |
| 8,509,982 | B2 | 8/2013 | Montemerlo et al. | |
| 8,634,980 | B1 | 1/2014 | Urmson et al. | |
| 8,660,734 | B2 | 2/2014 | Zhu et al. | |
| 8,688,306 | B1 | 4/2014 | Nemec et al. | |
| 8,825,264 | B2 | 9/2014 | Montemerlo et al. | |
| 8,874,305 | B2 | 10/2014 | Dolgov et al. | |
| 8,948,955 | B2 | 2/2015 | Zhu et al. | |
| 8,965,621 | B1 | 2/2015 | Urmson et al. | |
| 9,120,484 | B1 | 9/2015 | Ferguson et al. | |
| 9,122,948 | B1 | 9/2015 | Zhu et al. | |
| 9,268,332 | B2 | 2/2016 | Montemerlo et al. | |
| 9,425,561 | B2 | 8/2016 | Kim et al. | |
| 9,658,620 | B1 | 5/2017 | Urmson et al. | |
| 9,679,191 | B1 | 6/2017 | Zhu et al. | |
| 9,911,030 | B1 | 3/2018 | Zhu et al. | |
| 10,198,619 | B1 | 2/2019 | Zhu et al. | |
| 10,218,130 | B1 | 2/2019 | Jung | |
| 10,372,129 | B1 | 8/2019 | Urmson et al. | |
| 10,572,717 | B1 | 2/2020 | Zhu et al. | |
| 10,819,073 | B2 | 10/2020 | Azad | |
| 11,010,998 | B1 | 5/2021 | Dolgov et al. | |
| 11,106,893 | B1 | 8/2021 | Zhu et al. | |
| 11,152,746 | B2 * | 10/2021 | Hill | H01R 13/6277 |
| 2008/0220652 | A1 | 9/2008 | Tyler | |
| 2012/0083959 | A1 | 4/2012 | Dolgov et al. | |
| 2012/0083960 | A1 | 4/2012 | Zhu | |
| 2012/0083964 | A1 | 4/2012 | Montemerlo et al. | |
| 2013/0297140 | A1 | 11/2013 | Montemerlo et al. | |
| 2014/0136045 | A1 | 5/2014 | Zhu et al. | |
| 2014/0322976 | A1 * | 10/2014 | Raschilla | H01R 13/187 439/607.55 |
| 2014/0324268 | A1 | 10/2014 | Montemerlo et al. | |
| 2017/0080609 | A1 | 3/2017 | Praino et al. | |
| 2019/0067886 | A1 | 2/2019 | Jung | |

FOREIGN PATENT DOCUMENTS

| | | | |
|---|---|---|---|
| KR | 200467833 | Y1 | 7/2013 |
| KR | 20130132790 | A | 12/2013 |
| KR | 101692812 | B1 | 1/2017 |
| KR | 20170012304 | A | 2/2017 |
| KR | 20190020906 | A | 3/2019 |
| KR | 102029377 | B1 | 10/2019 |

* cited by examiner

Fig. 7 – Prior Art

Fig. 8 – Prior Art
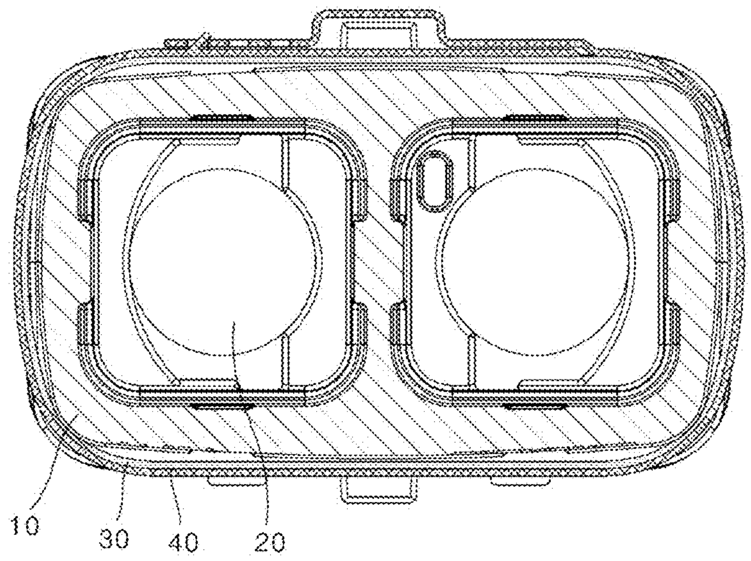

CONNECTING COMPONENT FOR SHIELDING A CONNECTOR AND A SHIELD CONNECTOR COMPRISING THE SAME

CROSS-REFERENCE TO RELATED APPLICATION

This application claims under 35 U.S.C. § 119(a) the benefit of priority to Korean Patent Application No. 10-2021-0026575 filed on Feb. 26, 2021, the entire contents of which are incorporated herein by reference.

BACKGROUND

(a) Technical Field

The present disclosure relates to a connecting component for shielding a connector and a shield connector including the same, and more particularly to a connecting component for shielding a connector, which has improved electromagnetic wave blocking performance, and a shield connector including the same.

(b) Background Art

In general, connectors are provided at electronic components in order to transmit power or electrical signals. Connectors are classified into low-voltage connectors and high-voltage connectors, which are selectively used depending on the use and functions of electronic components. The need for high-voltage connectors is increasing with the development of electric vehicles.

A wire to which a high current is applied is assembled with a high-voltage connector and an electromagnetic wave is generated around the wire due to the high current. In order to block electrical interference such as an electromagnetic wave, a high-voltage connector is formed to have an electromagnetic wave blocking structure.

As shown in FIG. 7, a conventional high-voltage shield connector having an electromagnetic wave blocking structure includes a shield housing 10, which is a shield connecting component coupled to a connector housing, a shield braid 30, which surrounds a wire 20 drawn from the rear side of the shield housing 10, and a clamp 40, which fixes the shield braid 30 to the shield housing 10.

However, in the conventional high-voltage shield connector, as shown in FIG. 8, when the clamp 40 is assembled with the shield housing 10 in order to fix the shield braid 30 to the shield housing 10, the shield braid 30 contacts only a portion of the shield housing 10. Thus, the electromagnetic wave blocking performance is poor.

In addition, in the conventional high-voltage shield connector, because the shield housing 10 is made of an aluminum material and the shield braid 30 is made of a copper material, corrosion due to contact between dissimilar metals occurs.

The above information disclosed in this Background section is only to enhance understanding of the background of the disclosure. Therefore, the Background section may contain information that does not form the related art that is already known in this country to a person of ordinary skill in the art.

SUMMARY OF THE DISCLOSURE

The present disclosure has been made in an effort to solve the above-described problems associated with the related art. It is an object of the present disclosure to provide a connecting component for shielding a connector, which improves electromagnetic wave blocking performance by improving adhesion to a shield component. It is another object of the present disclosure to provide a shield connector including the same.

It is another object of the present disclosure to provide a connecting component for shielding a connector, which improves electromagnetic wave blocking performance by preventing contact corrosion with a shield component. It is another object of the present disclosure to provide a shield connector including the same.

In one aspect, the present disclosure provides a connecting component for shielding a connector. The connecting component for shielding a connector includes: a housing body configured to surround at least a portion of a wire and to have a first end portion to which a first shield component is coupled and a second end portion to which a second shield component is coupled; a mounting groove formed in the second end portion of the housing body to allow the second shield component to be mounted therein; and a plurality of contact protrusions formed in the mounting groove so as to be in contact with the second shield component coupled to the second end portion of the housing body.

In an embodiment, the housing body may be provided on the outer surface thereof with an anti-corrosion plating layer. The anti-corrosion plating layer may be made of the same metal material as the second shield component.

In another embodiment, the housing body may be made of synthetic resin, the housing body may be provided on the outer surface thereof with a conductive plating layer to block electromagnetic waves, and the anti-corrosion plating layer may be formed on the outer surface of the conductive plating layer.

In still another embodiment, the first end portion of the housing body may be assembled with the first shield component in the state of being in contact with the outer surface of the first shield component.

In yet another embodiment, a reinforcing plating layer may be formed on the outer surface of the conductive plating layer between the conductive plating layer and the anti-corrosion plating layer.

In still yet another embodiment, the mounting groove may be formed so as to extend in the peripheral direction of the housing body. The plurality of contact protrusions may be disposed so as to be spaced apart from each other in the peripheral direction of the mounting groove.

In another aspect, the present disclosure provides a shield connector including: an outer housing; an inner housing accommodated in the outer housing; a rear shield shell mounted to the outer side of the inner housing and assembled with the inner side of the outer housing; a wire inserted into the inner housing; a shield braid surrounding and shielding at least a portion of the wire at the rear of the outer housing; and a shield connecting component having a first end portion, assembled with the inner side of the outer housing and coupled to the outer side of the rear shield shell, and a second end portion to which the shield braid is coupled.

In an embodiment, the shield connecting component may include a housing body having the first end portion and the second end portion. The housing body may be assembled with the inner side of the outer housing so as to surround a portion of the wire. The shield connecting component may also include a mounting groove formed in the second end portion of the housing body to allow the shield braid to be mounted therein and a plurality of contact protrusions formed in the mounting groove so as to be in contact with the shield braid coupled to the second end portion of the housing body.

In another embodiment, the housing body may be provided on the outer surface thereof with an anti-corrosion plating layer. The anti-corrosion plating layer may be made of the same metal material as the shield braid.

In still another embodiment, the housing body may be made of synthetic resin. The housing body may be provided on the outer surface thereof with a conductive plating layer to block electromagnetic waves. The anti-corrosion plating layer may be formed on the outer surface of the conductive plating layer.

In yet another embodiment, the first end portion of the housing body may be coupled to the rear shield shell in the state of being in contact with the outer surface of the rear shield shell.

In still yet another embodiment, a reinforcing plating layer may be formed on the outer surface of the conductive plating layer between the conductive plating layer and the anti-corrosion plating layer.

In a further embodiment, the mounting groove may be formed so as to extend in the peripheral direction of the housing body. The plurality of contact protrusions may be disposed so as to be spaced apart from each other in the peripheral direction of the mounting groove.

The above and other aspects, features, and embodiments of the disclosure are discussed below.

BRIEF DESCRIPTION OF THE DRAWINGS

The above and other features of the present disclosure are now described in detail with reference to embodiments thereof, illustrated in the accompanying drawings, which are given hereinbelow by way of illustration only, and thus are not limitative of the present disclosure, and wherein:

FIGS. 7 and 8 are views showing some components of a conventional shield connector.

Figure 1:
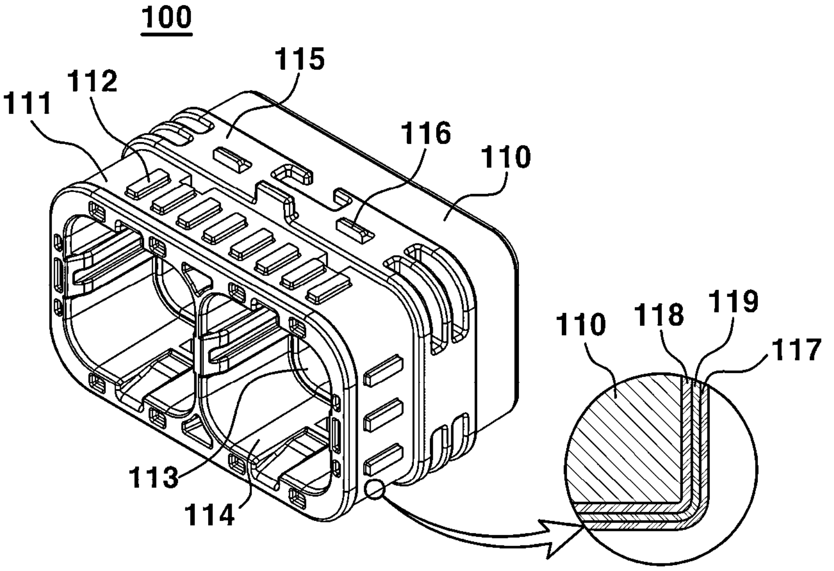
FIG. 1 is a perspective view showing a connecting component for shielding a connector according to an embodiment of the present disclosure.
Figure 2:
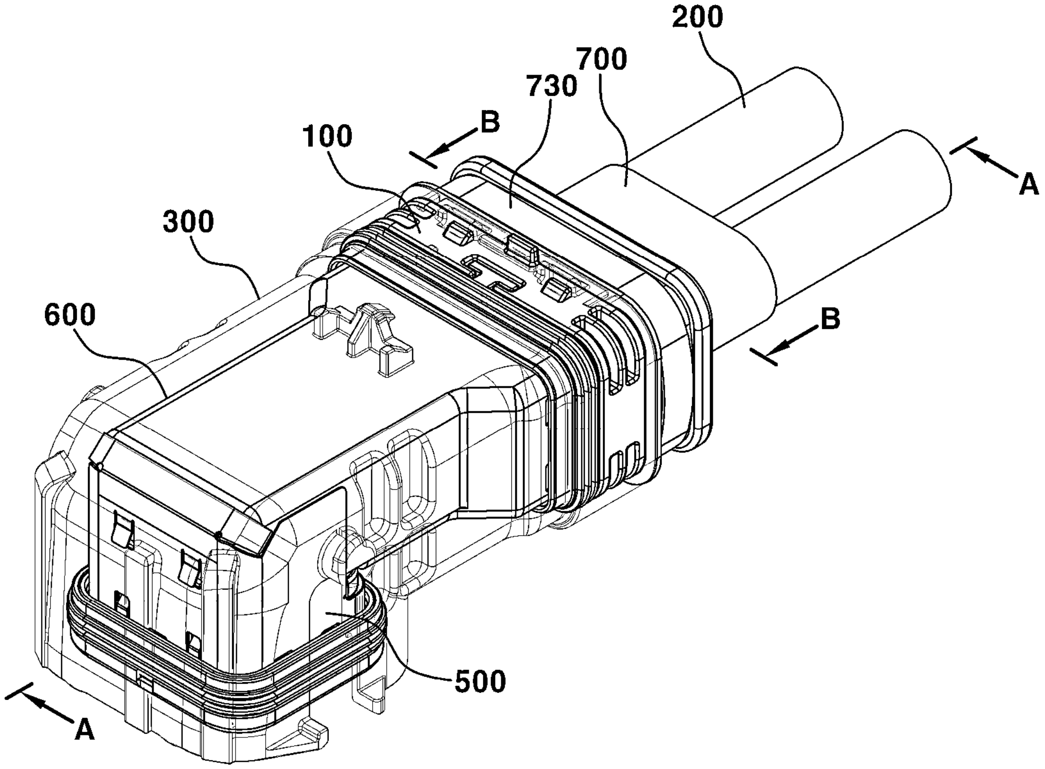
FIG. 2 is a coupled perspective view showing a shield connector including the connecting component for shielding a connector according to an embodiment of the present disclosure.
Figure 3:
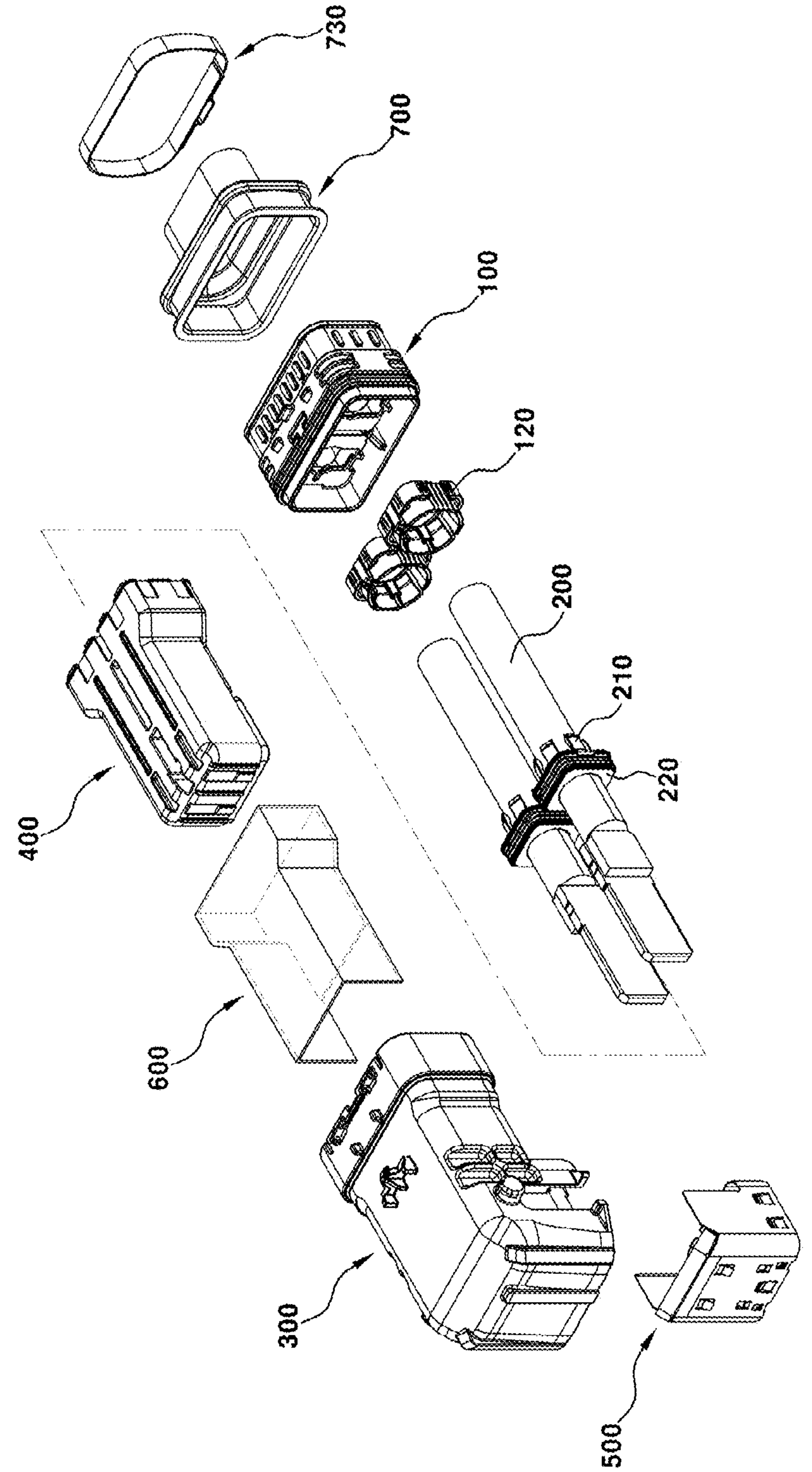
FIG. 3 is an exploded perspective view showing the shield connector.

It should be understood that the appended drawings are not necessarily to scale, presenting a somewhat simplified representation of various features illustrative of the basic principles of the disclosure. The specific design features of the present inventive concept as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure are described in detail with reference to the accompanying drawings. Contents represented in the accompanying drawings are diagrammed in order to easily describe the embodiments of the present disclosure, and the contents may be different from forms that are actually implemented.

Throughout the specification, when an element is referred to as "including" another element, the element should not be understood as excluding other elements so long as there is no special conflicting description, and the element may include at least one other element.

It should be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

When a component, device, element, or the like of the present disclosure is described as having a purpose or performing an operation, function, or the like, the component, device, or element should be considered herein as being "configured to" meet that purpose or perform that operation or function.

The present disclosure relates to a connecting component for shielding a connector and a shield connector including the same. The connecting component for shielding a connector according to the present disclosure improves electromagnetic wave blocking performance by improving adhesion to a shield component and preventing contact corrosion with the shield component.

FIG. 1 is a view showing a shield housing, which is a connecting component for shielding a connector according to an embodiment of the present disclosure. FIG. 2 to FIG. 6 are views showing a shield connector including the shield housing according to the embodiment of the present disclosure.

As shown in FIG. 1, a shield housing 100 according to the present disclosure includes a housing body 110, a mounting groove 111 formed in the housing body 110, a contact protrusion 112 provided at the housing body 110, and a plating layer formed on the surface of the housing body 110.

Figure 4:
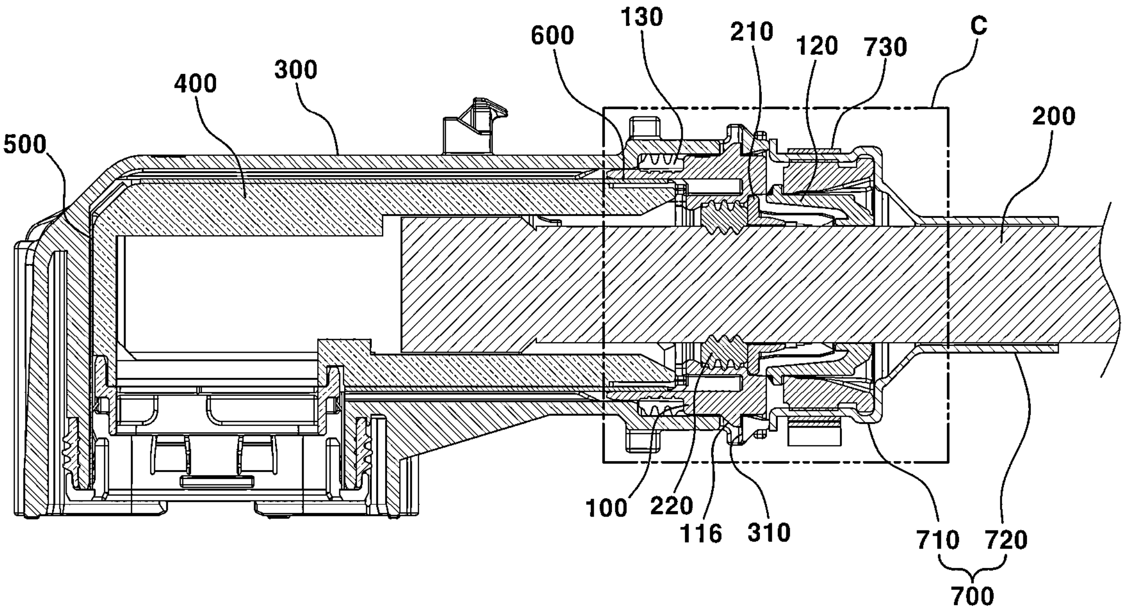
FIG. 4 is a cross-sectional view taken along line A-A in FIG. 2.

The housing body 110 is formed so as to surround a portion of a wire (refer to the wire 200 as shown in FIG. 4). Specifically, the housing body 110 is formed so as to surround at least a portion of the wire 200 in a longitudinal direction. The housing body 110 is formed so as to surround the wire 200 in a circumferential direction of the wire 200.

The housing body 110 has therein a through-hole 113 and a draw-out portion 114 through which the wire 200 passes. The through-hole 113 is formed in the front portion of the housing body 110 and the draw-out portion 114 is formed in the rear portion of the housing body 110.

Figure 5:
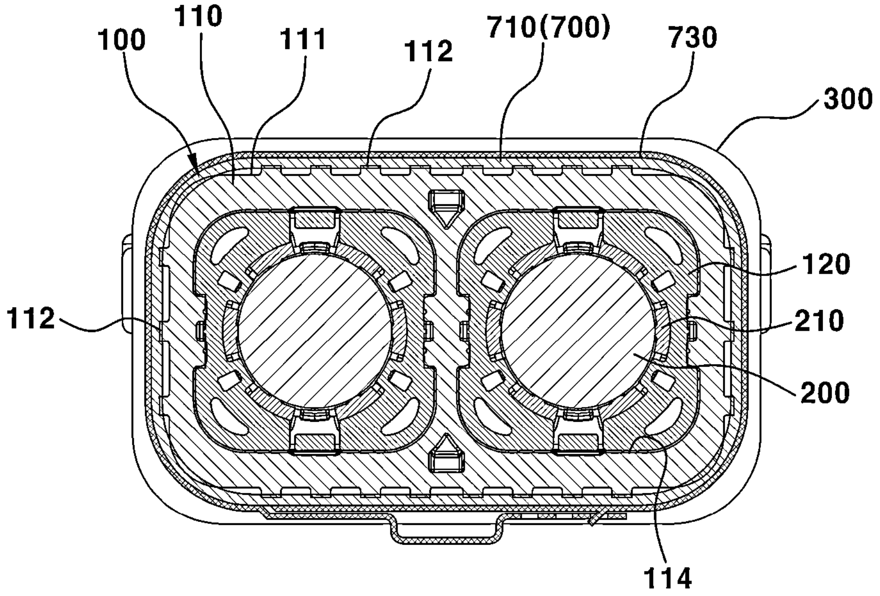
FIG. 5 is a cross-sectional view taken along line B-B in FIG. 2.

As shown in FIG. 5, a wire socket 120 and a wire holder 210 are disposed in the draw-out portion 114 in order to fix the wire 200 to the draw-out portion 114. The wire socket 120 may be mounted in the draw-out portion 114 and the wire holder 210 may be assembled with the wire 200. Due to the wire socket 120 and the wire holder 210 being coupled to the draw-out portion 114, the wire 200 is fixed to the draw-out portion 114.

The front portion of the housing body 110 includes a portion to which a rear shield shell (refer to the shield shell 600 in FIG. 4), which is a first shield component, is coupled (i.e., a first end portion), and the rear portion of the housing body 110 includes a portion to which a shield braid (refer to the shield braid 700 in FIG. 4), which is a second shield component, is coupled (i.e. a second end portion).

Although the housing body 110 is illustrated in FIG. 1 as being formed in the shape of a hexahedron having a rectangular-shaped cross-section, the shape of the housing body 110 is not limited thereto. The housing body 110 may be formed in any of various other shapes depending on the number and arrangement of wires 200. Specifically, the housing body 110 may have therein multiple through-holes 113 and multiple draw-out portions 114 depending on the number of wires 200.

A portion of the wire 200 that extends forwards of the through-hole 113 passes through the rear shield shell 600. A portion of the wire 200 that extends rearwards of the draw-out portion 114 passes through the shield braid 700 and is drawn out to the outside of the shield braid 700. The wire 200 may be a shield wire having an individual shielding structure.

The mounting groove 111 for engagement with the shield braid 700 is formed in the peripheral surface of the rear portion of the housing body 110 in which the draw-out portion 114 is formed. In other words, the mounting groove 111 for assembly with the shield braid 700 is formed in the second end portion of the housing body 110.

The mounting groove 111 may be formed so as to extend along the periphery of the second end portion of the housing body 110. For example, the mounting groove 111 may be formed as a rectangular annular groove having a predetermined width and a predetermined depth. The mounting groove 111 may be formed in a shape recessed in the outer surface of the housing body 110.

Figure 6:
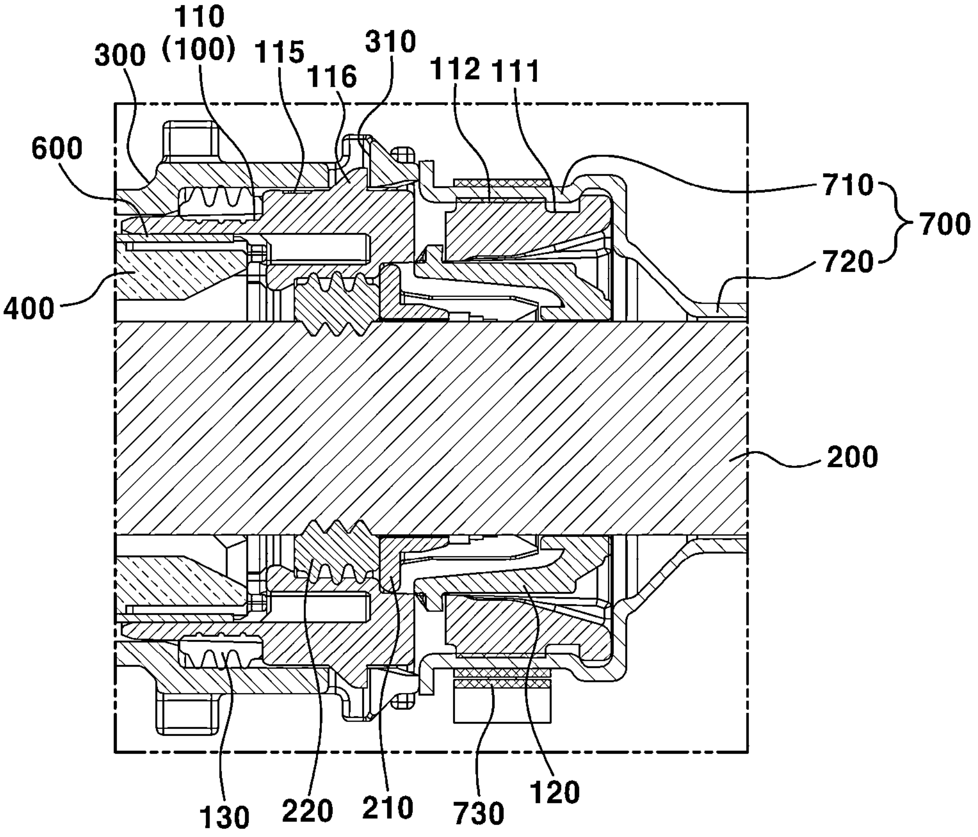
FIG. 6 is an enlarged view showing the portion C in FIGS. 4.
Figure 6:
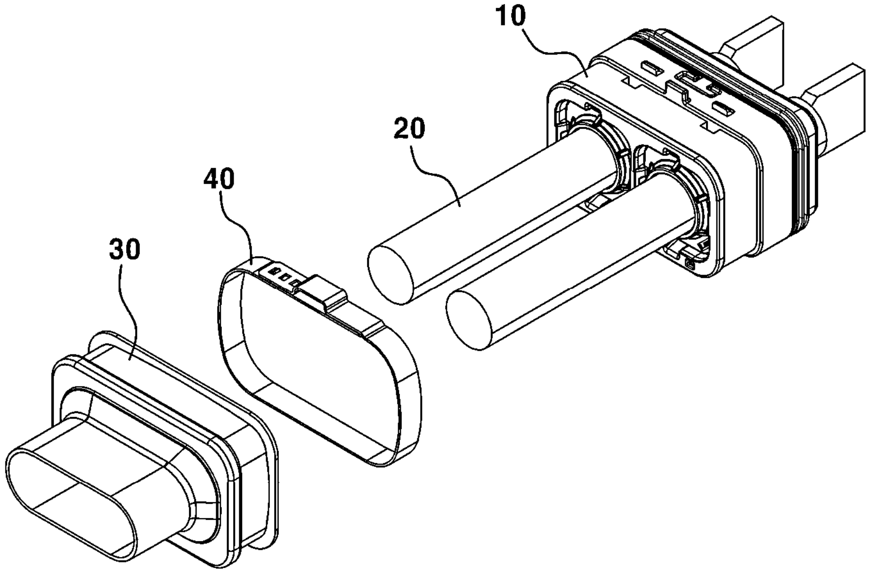

A plurality of contact protrusions 112, which contact the shield braid 700, are formed in the mounting groove 111. As shown in FIGS. 5 and 6, since the contact protrusions 112 are in contact with the inner surface (i.e., the inner peripheral surface) of the shield braid 700 that is engaged with the mounting groove 111, adhesion of the shield braid 700 to the housing body 110 is improved. In other words, the contact protrusions 112 increase the contact area between the shield braid 700 and the housing body 110, thereby improving adhesion of the shield braid 700 to the housing body 110.

Specifically, the contact protrusions 112 are formed so as to protrude from the bottom surface of the mounting groove 111 and are arranged so as to be spaced apart from each other along the periphery of the mounting groove 111. The contact protrusions 112 are not formed on the corner portions of the mounting groove 111.

The contact protrusions 112 may contact the shield braid 700 while being pressed by the coupling force applied to the shield braid 700 by the clamp 730. The shield braid 700 may be brought into contact with the bottom surface of the mounting groove 111 at the corner portions of the mounting groove 111 by the coupling force applied thereto by the clamp 730.

The contact protrusions 112 may be formed in the shape of a straight bar that extends in the longitudinal direction of the housing body 110. The contact protrusions 112 may be disposed so as to be oriented perpendicular to the peripheral direction of the clamp 730, thereby preventing the shield braid 700, which is fixed to the housing body 110 by the clamp 730, from being undesirably rotated in the mounting groove 111. The longitudinal direction of the housing body 110 may be the same as the longitudinal direction of the wire 200 assembled with the housing body 110.

Further, when the mounting groove 111 is formed as a rectangular annular groove, the contact protrusions 112 may be formed on the upper surface, the lower surface and the side surfaces of the mounting groove 111, rather than on the corner portions of the mounting groove 111. In this case, although not shown in the drawings, the contact protrusions formed on the upper surface of the mounting groove 111 may gradually protrude higher toward the center of the upper surface of the mounting groove 111. Further, the contact protrusions formed on the lower surface of the mounting groove 111 may gradually protrude higher toward the center of the lower surface of the mounting groove 111. Also, the contact protrusions formed on each side surface of the mounting groove 111 may gradually protrude higher toward the center of each side surface of the mounting groove 111. This height difference between the contact protrusions 112 depending on the position thereof may further increase adhesion of the shield braid 700 to the housing body 110.

In addition, a stepped portion 115 for engagement with an outer housing (refer to outer housing 300 in FIG. 6) is formed at the first end portion of the housing body 110. The stepped portion 115 may be disposed adjacent to the mounting groove 111 and may be formed so as to extend along the periphery of the housing body 110 and to be higher than the mounting groove 111.

As shown in FIG. 6, when the stepped portion 115 is inserted into the outer housing 300, the first end portion of the housing body 110 is assembled with the outer side of the rear shield shell 600 and comes into contact with the outer surface of the rear shield shell 600.

The housing body 110 may be made of synthetic resin in order to facilitate formation of the shield housing 100, which has the mounting groove 111, the contact protrusions 112, the through-hole 113, and the draw-out portion 114, and to prevent contact corrosion of the shield housing 100 and the rear shield shell 600. Specifically, the housing body 110 may be made of a material such as plastic. For example, the housing body 110 may be made of a material such as engineering plastic.

As shown in FIG. 1, the outer surface of the housing body 110 is coated with an anti-corrosion plating layer 117, which is made of the same metal material as the shield braid 700. The anti-corrosion plating layer 117 is the outermost plating layer among the plating layers formed on the outer surface of the housing body 110. Since the anti-corrosion plating layer 117 is made of the same metal material as the shield braid 700, it is capable of preventing a corrosion phenomenon (i.e., a galvanic corrosion phenomenon) due to contact between the shield housing 100 and the shield braid 700.

In addition, a conductive plating layer 118 enabling electrical transmission is formed on the outer surface of the housing body 110. The conductive plating layer 118 is the innermost plating layer among the plating layers formed on the outer surface of the housing body 110. The conductive plating layer 118 blocks electromagnetic waves radiated from the shield housing 100. The anti-corrosion plating layer 117 is disposed on the outer surface of the conductive plating layer 118.

In addition, a reinforcing plating layer 119 for protecting the conductive plating layer 118 is formed on the outer surface of the housing body 110. The reinforcing plating layer 119 is an intermediate plating layer among the plating layers formed on the outer surface of the housing body 110. The reinforcing plating layer 119 is formed on the outer surface of the conductive plating layer 118 so as to be disposed between the conductive plating layer 118 and the anti-corrosion plating layer 117. In this case, the anti-corrosion plating layer 117 is formed on the outer surface of the reinforcing plating layer 119.

For example, the conductive plating layer 118 may be made of a material such as copper, the anti-corrosion plating layer 117 may be made of a material such as chrome, and the reinforcing plating layer 119 may be made of a material such as nickel. In this case, each of the conductive plating layer 118 and the reinforcing plating layer 119 may be formed to have a thickness of 20 μm or more, and the anti-corrosion plating layer 117 may be formed to have a thickness of 0.2 μm or more.

FIGS. 2-6 show a shield connector including the shield housing 100 configured as described above. In the following description of the shield housing 100, a description of subject matter redundant with the contents described above is omitted.

As shown in FIGS. 2-6, the shield connector includes an outer housing 300, an inner housing 400, a front shield shell 500, a rear shield shell 600, a shield braid 700, and a shield housing 100.

The outer housing 300 is formed to have an inner space in which the inner housing 400 and the rear shield shell 600, assembled with the inner housing 400, are accommodated. The outer housing 300 may be made of a material such as plastic, and in one embodiment may be made of an engineering plastic material.

In addition, the outer housing 300 has therein a plurality of fixing recesses 310 to fix the shield housing 100 thereto. The fixing recesses 310 are disposed at the rear portion of the outer housing 300 and are formed in the shape of a recess or a hole.

The inner housing 400 is accommodated in the outer housing 300 using the rear shield shell 600 mounted in the outer housing 300. The inner housing 400 is formed to have an internal structure capable of supporting the wire 200 and the terminal of the wire 200, which are inserted thereinto. One end portion of the wire 200 in the longitudinal direction is disposed inside the inner housing 400.

The inner housing 400 may be formed of a material such as plastic, and specifically may be formed of an engineering plastic material.

The rear shield shell 600 is mounted outside the inner housing 400 and is inserted into and assembled with the outer housing 300 together with the inner housing 400. At this time, the rear shield shell 600 is inserted into the outer housing 300 from the rear portion of the outer housing 300.

Although not shown in the drawings, the rear shield shell 600 may have a fixing portion integrally formed therewith to fix the rear shield shell 600 to the outer housing 300. In this case, the fixing portion may have a known configuration that is applied to a component that is assembled with the inner side of a housing of a connector.

The front shield shell 500 is assembled with the inner side of the outer housing 300 and is disposed in front of the rear shield shell 600. The front shield shell 500 serves to block electromagnetic waves inside the outer housing 300 together with the rear shield shell 600. Each of the front shield shell 500 and the rear shield shell 600 may be made of a conductive metal material such as a copper alloy.

The shield braid 700 blocks electromagnetic waves generated from the wire 200 and is made of a conductive metal material to block electromagnetic waves. For example, the shield braid 700 may be formed in the shape of a pipe that surrounds a plurality of wires 200. Further, the shield braid 700 may be formed of a chrome material.

The shield braid 700 is configured to surround at least a portion of the wire 200 at the rear of the outer housing 300 and blocks electromagnetic waves generated from the wire 200 together with the shield housing 100 and the rear shield shell 600.

The shield braid 700 includes a coupling portion 710, which is formed at the front portion thereof so as to be engaged with the mounting groove 111 in the shield housing 100 while surrounding the mounting groove 111, and a shielding portion 720, which is formed at the rear portion thereof in a pipe shape so as to surround a portion of the wire 200.

The shielding portion 720 blocks electromagnetic waves generated from the wire 200 together with the coupling portion 710. The coupling portion 710 is fixedly mounted in the mounting groove 111 in the shield housing 100 using the clamp 730. In other words, the coupling portion 710 fixes the shield braid 700 to the shield housing 100 using the coupling force applied thereto by the clamp 730.

Here, the wire 200 passes through the shielding portion 720 and is drawn out from the rear portion of the shield braid 700. A portion of the periphery of the wire 200 may contact the inner peripheral surface of the shielding portion 720.

The clamp 730 may be formed as a strap made of a metal material. Locking members, which are engaged with each other, may be provided at respective ends of the clamp 730 in the longitudinal direction. The locking members may be composed of a locking protrusion and a locking hole. The clamp 730 may provide coupling force to the shield braid 700 using the locking members so that the coupling portion 710 of the shield braid 700 is fixed in the mounting groove 111 in the shield housing 100.

In addition to the housing body 110, the mounting groove 111, and the contact protrusions 112 described above, the shield housing 100 further includes a plurality of fixing protrusions 116 formed on the housing body 110.

The fixing protrusions 116 serve to fix the shield housing 100 including the housing body 110 to the outer housing 300. The fixing protrusions 116 are formed so as to protrude from the stepped portion 115 of the housing body 110 and are arranged so as to be spaced apart from each other along the periphery of the stepped portion 115.

When the stepped portion 115 of the housing body 110 is inserted into the rear portion of the outer housing 300, the fixing protrusions 116 are fitted into the fixing recesses 310 in the outer housing 300, whereby the shield housing 100 is fixed to the outer housing 300. The shield housing 100 may be forcibly inserted into the outer housing 300 until the fixing protrusions 116 are fitted into the fixing recesses 310.

When the housing body 110 is coupled to the outer housing 300 using the fixing protrusions 116, the first end portion of the housing body 110 is mounted outside the rear shield shell 600 and comes into contact with the outer surface of the rear shield shell 600.

When the coupling portion 710, which is the front portion of the shield braid 700, is coupled to the mounting groove 111 in the housing body 110, the contact protrusions 112 of the housing body 110 come into contact with the inner surface (i.e., the inner peripheral surface) of the shield braid 700.

In addition, a sealing seal 130, which is made of a silicon material, is provided at the first end portion of the housing body 110. The sealing seal 130 serves to hermetically seal a gap between the housing body 110 and the outer housing 300. In other words, the sealing seal 130 connects the housing body 110 to the outer housing 300 in an airtight manner.

When assembled with the shield housing 100, the wire 200 may be inserted into the inner housing 400. The wire

200 is fixed to the housing body 110 of the shield housing 100 while passing through the housing body 110. Specifically, the wire 200 is fixed to the housing body 110 using the wire socket 120, which is mounted in the housing body 110, and the wire holder 210, which is assembled on the outer circumferential surface of the wire 200.

The wire 200 may be fixed to the housing body 110 through engagement with the wire socket 120 and the wire holder 210. The wire socket 120 may be mounted in the draw-out portion 114 of the housing body 110.

The wire socket 120 and the wire holder 210 may be made of a material such as plastic, and specifically may be made of engineering plastic.

In addition, the wire 200 and the housing body 110 may be hermetically connected to each other by a wire seal 220 assembled on the outer circumferential surface of the wire 200.

The shield housing 100 and the shield connector including the shield housing 100 described above have the following advantages.

First, since the shield housing 100, which is connected to the shield braid 700 and the rear shield shell 600, is made of synthetic resin and the surface of the shield housing 100 is plated with the anti-corrosion plating layer 117, which is made of the same metal material as the shield braid 700, it is possible to prevent corrosion of the shield housing 100 attributable to a galvanic corrosion phenomenon and thus to improve electromagnetic wave blocking performance.

Second, it is possible to increase adhesion of the shield braid 700 and the rear shield shell 600 to the shield housing 100. The electromagnetic wave blocking performance of the shield housing 100 and the shield connector are thereby improved.

In addition, when engaged with a mating connector, the above-described shield connector may be connected to a vehicle body via the mating connector and may realize blocking of electromagnetic waves together with the mating connector and the vehicle body.

As should be apparent from the above description, the present disclosure has the following effects.

First, since a shield housing, which is coupled to a shield component, is made of synthetic resin and the surface of the shield housing is plated with a plating layer, which is made of the same metal material as the shield component, it is possible to prevent corrosion of the shield housing attributable to a galvanic corrosion phenomenon and thus to improve electromagnetic wave blocking performance.

Second, it is possible to increase adhesion of the shield component to the shield housing, thereby improving the electromagnetic wave blocking performance of the shield housing and a shield connector.

The inventive concept has been described in detail with reference to embodiments thereof. It should be understood that the terms and words used in the specification and appended claims should not be construed as being limited to general and dictionary meanings. The embodiments described in the specification and shown in the drawings are illustrative only and are not intended to represent all aspects of the disclosure, such that various equivalents and modifications can be made without departing from the principles and spirit of the disclosure, the scope of which is defined in the appended claims and their equivalents.

What is claimed is:

1. A connecting component for shielding a connector, the connecting component comprising:

a housing body configured to surround at least a portion of a wire, the housing body having a first end portion to which a first shield component is coupled and a second end portion to which a second shield component is coupled;

a mounting groove formed in the second end portion of the housing body to allow the second shield component to be mounted therein; and a plurality of contact protrusions formed in the mounting groove so as to be in contact with the second shield component coupled to the second end portion of the housing body, wherein the first end portion of the housing body is assembled with the first shield component in a state of being in contact with an outer surface of the first shield component.

2. The connecting component of claim 1, wherein the housing body is provided on an outer surface thereof with an anti-corrosion plating layer, and wherein the anti-corrosion plating layer is made of a same metal material as the second shield component.

3. The connecting component of claim 2, wherein the housing body is made of synthetic resin, wherein the housing body is provided on the outer surface thereof with a conductive plating layer to block an electromagnetic wave, and wherein the anti-corrosion plating layer is formed on an outer surface of the conductive plating layer.

4. The connecting component of claim 3, wherein a reinforcing plating layer is formed on an outer surface of the conductive plating layer between the conductive plating layer and the anti-corrosion plating layer.

5. The connecting component of claim 1, wherein the mounting groove is formed so as to extend in a peripheral direction of the housing body, and wherein the plurality of contact protrusions is disposed so as to be spaced apart from each other in a peripheral direction of the mounting groove.

6. A shield connector comprising:

an outer housing;

an inner housing accommodated in the outer housing;

a rear shield shell mounted to an outer side of the inner housing and assembled with an inner side of the outer housing;

a wire inserted into the inner housing;

a shield braid surrounding and shielding at least a portion of the wire at a rear of the outer housing; and a shield connecting component having a first end portion, assembled with the inner side of the outer housing and coupled to an outer side of the rear shield shell, and a second end portion to which the shield braid is coupled, wherein the shield connecting component comprises:

a housing body having the first end portion and the second end portion, the housing body being assembled with the inner side of the outer housing so as to surround a portion of the wire;

a mounting groove formed in the second end portion of the housing body to allow the shield braid to be mounted therein; and a plurality of contact protrusions formed in the mounting groove so as to be in contact with the shield braid coupled to the second end portion of the housing body, wherein the first end portion of the housing body is coupled to the rear shield shell in a state of being in contact with an outer surface of the rear shield shell.

7. The shield connector of claim 6, wherein the housing body is provided on an outer surface thereof with an anti-corrosion plating layer, and wherein the anti-corrosion plating layer is made of a same metal material as the shield braid.

8. The shield connector of claim 7, wherein the housing body is made of synthetic resin, wherein the housing body is provided on the outer surface thereof with a conductive plating layer to block an electromagnetic wave, and wherein the anti-corrosion plating layer is formed on an outer surface of the conductive plating layer.

9. The shield connector of claim 8, wherein a reinforcing plating layer is formed on an outer surface of the conductive plating layer between the conductive plating layer and the anti-corrosion plating layer.

10. The shield connector of claim 6, wherein the mounting groove is formed so as to extend in a peripheral direction of the housing body, and wherein the plurality of contact protrusions is disposed so as to be spaced apart from each other in a peripheral direction of the mounting groove.

* * * * *